March 31, 1925.

L. C. BREWER

FARM IMPLEMENT

Filed Aug. 25, 1924

1,531,643

Inventor
L. C. Brewer
By C. A. Snow & Co.
Attorney

Patented Mar. 31, 1925.

1,531,643

UNITED STATES PATENT OFFICE.

LEWIS COLEMAN BREWER, OF MIDLOTHIAN, TEXAS, ASSIGNOR OF ONE-THIRD TO CHARLIE W. REAGON, OF CHATFIELD, TEXAS.

FARM IMPLEMENT.

Application filed August 25, 1924. Serial No. 734,101.

*To all whom it may concern:*

Be it known that I, LEWIS COLEMAN BREWER, a citizen of the United States, residing at Midlothian, in the county of Ellis and State of Texas, have invented a new and useful Farm Implement, of which the following is a specification.

This invention relates to improvements in farm implements and more particularly to cultivating implements.

The object of the invention is to provide an attachment adapted to be fastened to any standard make of riding cultivator and which is used as a substitute for the front shanks or feet of any shovel or plow which fastens on any shank or feet.

Another object is to so construct an attachment of this character as to enable the user to plow closer and deeper than the plow now in use and which is especially constructed for use in plowing young or small plants.

Another object is to so construct the plow attachment that it handles the earth in the best possible way, it being adjustable to permit the plow to be raised and lowered for shallow or deeper plowing.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figures 1, 2:
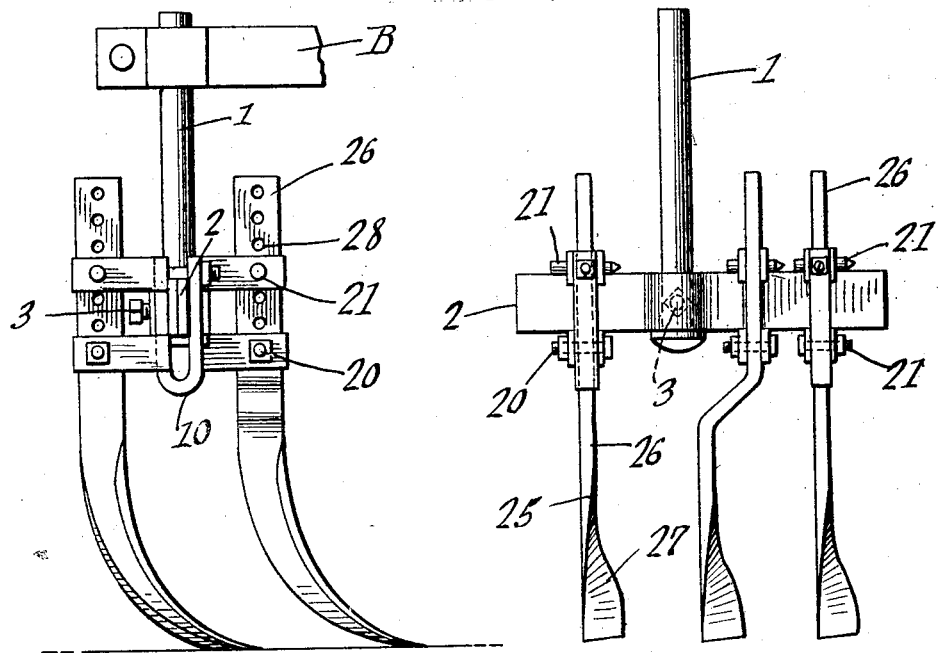
Figure 1 represents a side elevation of the attachment constituting this invention shown applied.
Fig. 2 is a front elevation thereof.

In the embodiment illustrated a round shank 1 is shown of proper size and length to fit an eye bolt which holds it to the beam of any standard riding cultivator, said beam being indicated at B in Fig. 1.

A plow bar 2 of proper length and dimensions to carry as many plows as may be necessary or desirable to use is shown secured to the lower end of the shank 1 by means of a set screw 3. As shown this bar 2 is composed of two strips of heavy metal 4 and 5 bulged or bowed outwardly at points midway their ends to form a bearing to receive the shank 1 as is shown clearly in Fig. 3.

A plurality of clips 10 are fastened on the bar 2 at such distances apart as may be necessary for the best service. These clips are exactly alike and hence one only will be described in detail. As shown they are constructed of heavy strap iron and comprise a U-shaped member 11 desired to straddle the plow bar 2 and be secured thereto by means of bolts as 12. Two pairs of parallel arms numbered 13 and 14 and 15 and 16 respectively project laterally from the outer face of the arm 17 of member 11 being here shown made integral therewith and extending from the side edges thereof. These arms are provided at their free ends with registering apertures 18 and 19. The apertures 18 are designed to receive bolts 20 for connecting the plow 25 to the bar. Break pins 21 are designed to be inserted in the apertures 18 in the upper arms 13 and 14 so that in case the plow should strike some solid substance this pin will break and save the plow point from breaking as is usual with devices of this character.

Figures 3, 4:
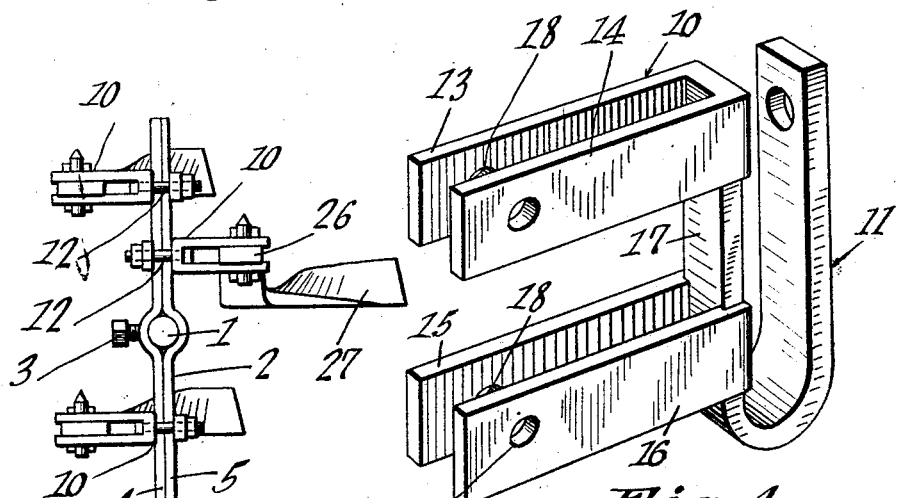
Fig. 3 is a top plan view.
Fig. 4 is a detail perspective of one of the attaching clips.

The plows 25 are constructed of one piece of material consisting of a shank 26 and a blade 27. These blades 27 as shown extend substantially at right angles to the shank 26 and are twisted slightly so as to position them flatwise as shown in Fig. 3 adapting them to handle the earth in the best possible way. Shanks 26 of the plow are provided with a plurality of longitudinally spaced apertures 28 to provide for the plow being adjusted vertically for shallow or deep plowing.

The clips 10 as shown in Fig. 3 are reversible and may be used either in front or in rear of the plow bar 2 to vary the position of the plows to adapt them for use on different kinds of plants.

I claim:—

1. An attachment of the class described comprising a plow bar composed of two strips of heavy metal arranged face to face in contact with each other and outwardly bulged at points midway their ends to form a shank receiving bearing, a shank detachably mounted in said bearing for connecting the bar to a plow beam, a plurality of clips fastened to the bar at intervals and having shovel supporting arms, the arms of one clip being extended forwardly and those of others rearwardly to position the plows one in front of the other.

2. A clip for attaching plows to a bar comprising a U-shaped member having pairs of laterally extending vertically spaced arms carried by one leg thereof and apertured for the passage of a connecting bolt.

3. A clip of the class described comprising a U-shaped member having one leg thereof provided on its outer side edges with laterally extending pairs of arms, the pairs of arms being spaced vertically from each other and each provided with registering apertures for fastening elements whereby the clips may be attached to a plow shank.

In testimony that I claim the foregoing as my own, I have hereto affixed my signature in the presence of two witnesses.

LEWIS COLEMAN BREWER.

Witnesses:
W. E. MIDDLETON, Jr.,
E. J. DILLE.